(12) United States Patent
Borden

(10) Patent No.: US 8,002,523 B2
(45) Date of Patent: Aug. 23, 2011

(54) TURBINE SYSTEM AND METHOD FOR EXTRACTING ENERGY FROM WAVES, WIND, AND OTHER FLUID FLOWS

(76) Inventor: Saxon D. Borden, Houston, TX (US)

( * ) Notice: Subject to any disclaimer, the term of this patent is extended or adjusted under 35 U.S.C. 154(b) by 375 days.

(21) Appl. No.: 12/259,185

(22) Filed: Oct. 27, 2008

(65) Prior Publication Data

US 2009/0108584 A1  Apr. 30, 2009

Related U.S. Application Data

(60) Provisional application No. 61/000,447, filed on Oct. 26, 2007.

(51) Int. Cl.
  *F03B 3/04* (2006.01)
  *F03B 3/12* (2006.01)
  *F03D 1/02* (2006.01)
  *F03D 1/06* (2006.01)

(52) U.S. Cl. ..... 416/1; 416/195; 416/196 A; 416/197 A; 416/200 R; 416/202; 416/210 R; 416/211; 416/84; 416/DIG. 6; 416/246

(58) Field of Classification Search ............ 415/1, 3.1, 415/4.3, 4.5, 7, 908; 416/1, 246, 194, 195, 416/196 R, 196 A, 197 A, 198 R, 198 A, 416/200 R, 200 A, 202, 210 R, 210 A, 211, 416/84, 86, DIG. 6
See application file for complete search history.

(56) References Cited

U.S. PATENT DOCUMENTS

| 747,775 | A | * | 12/1903 | Roberts | 416/210 R |
| 3,930,750 | A | * | 1/1976 | Schultz | 416/197 A |
| 4,015,911 | A | * | 4/1977 | Darvishian | 416/197 A |
| 4,137,005 | A | | 1/1979 | Comstock | |
| 4,296,602 | A | | 10/1981 | Hales et al. | |
| 4,355,958 | A | * | 10/1982 | Cornick | 416/197 A |
| 4,359,868 | A | * | 11/1982 | Slonim | 415/7 |
| 4,421,991 | A | | 12/1983 | McLaughlin | |
| 4,589,820 | A | * | 5/1986 | Butler, Jr. | 416/196 A |
| 5,311,064 | A | | 5/1994 | Kumbatovic | |
| 5,328,334 | A | * | 7/1994 | McCauley | 416/196 A |
| 6,133,644 | A | | 10/2000 | Smith et al. | |
| 6,602,054 | B1 | * | 8/2003 | Sherman | 416/198 A |
| 6,935,832 | B1 | | 8/2005 | Platt et al. | |
| 7,862,301 | B2 | * | 1/2011 | Wu | 416/198 R |
| 2004/0096310 | A1 | | 5/2004 | Regan et al. | |
| 2005/0005592 | A1 | | 1/2005 | Fielder | |

FOREIGN PATENT DOCUMENTS

| CA | 2532734 A1 | 7/2007 |
| EP | 0384757 A1 | 8/1990 |
| WO | WO 2004/048774 A1 | 6/2004 |
| WO | WO 2007/146542 A2 | 12/2007 |
| WO | WO 2007/148120 A1 | 12/2007 |

* cited by examiner

*Primary Examiner* — Christopher Verdier

(74) *Attorney, Agent, or Firm* — Brett T. Cooke; Andrews Kurth LLP

(57) ABSTRACT

An apparatus and method for harvesting fluid energy including a wave turbine consisting of a long shaft having pairs of buckets positioned at intervals along the shaft and rotated 90 degrees from each adjacent pair. Each bucket is connected at an offset angle with respect to a plane that is normal to the shaft. When adapted for harnessing wave energy, the shaft is elevated above water surface and positioned at an oblique angle to the prevailing wave fronts. Each bucket is positively buoyant, so that buckets capture both potential and kinetic wave energy.

19 Claims, 8 Drawing Sheets

TURBINE SYSTEM AND METHOD FOR EXTRACTING ENERGY FROM WAVES, WIND, AND OTHER FLUID FLOWS

CROSS REFERENCE TO RELATED APPLICATION

This application is based upon provisional application 61/000,447 filed on Oct. 26, 2007, the priority of which is claimed.

BACKGROUND OF THE INVENTION

1. Field of the Invention

This invention relates generally to a source of alterative and environmentally clean energy, and in particular, to a system and method for extracting energy from ocean waves.

2. Description of the Prior Art

With increasing petroleum prices, political conflict, and the concern of global warming, there exists a growing world demand for alternative energy sources. It has been estimated that the total power of waves breaking on the world's coastlines at any given moment is between 2-3 terawatts. In favorable areas, such as environments typical of the west coast of the United States, Alaska, the north Atlantic coast, Canada, Europe, Australia, Hawaii, South Africa, and Chile, where the wave amplitude may reach 5-10 meters, wave power density may average 65 megawatts per mile of coastline. The barrel of oil equivalent is approximately 38 barrels of oil per hour per mile of coastline. By efficiently and economically harvesting wave energy, waves may provide a clean and unlimited energy source.

There have been attempts to tap into this unlimited energy source and make it economically viable. For example, U.S. Pat. No. 4,296,602 issued to Hales et al. and U.S. Pat. No. 4,137,005 issued to Comstock each disclose an elongate paddlewheel that has curved blades mounted about the diameter of the paddlewheel drums. Hales et al. and Comstock teach to orient the paddlewheels parallel to the wave front so that the force of an oncoming wave is received across the entire paddlewheel. Such an arrangement promotes the tendency of the paddlewheel to revolve with uneven speeds as a function of the periodic wave frequency, and it also tends to create reflected waves. U.S. Pat. No. 6,133,644 issued to Smith et al. discloses an elongate paddle having straight blading and oriented parallel with the oncoming waves for capturing wave kinetic energy. The straight blading is helically arranged about the paddlewheel. The Smith et al. device promotes continuous revolution of the paddlewheel and minimized wave reflections, but the device makes no provision for capturing potential energy of the waves. U.S. Pat. No. 6,935,832 issued to Platt et al. discloses a turbine device arranged for axial flow; due to its reduced footprint, such an arrangement is only exposed to a limited amount of wave power. Finally, European Patent Publication No. 384,757 in the name of Haleem, shows an elongate wave turbine that is oriented at an oblique angle to the wave front, which promotes continuous revolution of the drive shaft and minimizes wave reflections. Haleem discloses a device that is adapted to harness the potential energy of waves through the use of pivoting members on each blade. However, the complexity and large number of moving parts in the Haleem device increases its manufacturing and operating costs, particularly in the harsh ocean environment. It is desirable, therefore, to have a wave turbine that has a simple construction, that is efficient in capturing both wave kinetic and potential energies, and that is oriented at an oblique angle to the predominant wave fronts for promoting continuous revolution and for minimizing the creation of reflected waves.

Information pertaining to harvesting wave energy can be found in the following references, which are incorporated herein by reference:

Falnes, L. and Lovesethj. "Ocean Wave Energy", Energy Policy, Vol. 19, No. 8, p. 768-775, 1991.

Hotta, H, et al. "On the Open Sea Test of a Prototype Device of a Floating Wave Power Device Mighty Whale", Second European Wave Energy Conference, Lisbon, 1995.

Krogstad, Harold E. and Arntsen, Oivind A. "Linear Wave Theory" Part A, Trondheim Norway: Norwegian University of Science and Technology.

Krogstad, Harold E. and Arntsen, Oivind A. "Linear Wave Theory" Part A, Trondheim Norway: Norwegian University of Science and Technology.

Mollison, D. "Wave Climate and the Wave Power Resource", in Hydrodynamics of Ocean Wave-Energy utilization, Evans and Falcao (eds), Springer-Verlag, pp. 133-156, 1986.

"New Re-View Quarterly Newsletter for the UK Renewable Energy Industry, Issue 43 February 2000.

P. White, 1989. "Developments in Norwegian Wave Energy", Conference on Wave Energy Devices, Coventry, 1989.

World Energy Council. "Renewable Energy Resources: Opportunities and Constraints 1990-2020" 1993.

3. Identification of Objects of the Invention

A primary object of the invention is to provide a wave turbine that simultaneously receives energy from multiple waves in a continuous fashion by use of a long wave turbine oriented at an oblique angle to the predominant wave fronts, with the blades offset from, and oriented at an oblique angle to, the shafting.

Another object of the invention is to provide a wave turbine that interacts with only a small portion of a wave front at any single moment in time so as not to significantly impede the flow of the wave.

Another object of the invention is to provide a wave turbine disposed essentially above the water level at a selectively adjustable elevation, for example, by the use of telescopic actuators at the pilings.

Another object of the invention is to provide a wave turbine with positively buoyant blades that capture both the wave's kinetic and potential (buoyant lifting) energies.

Another object of the invention is to provide a wave turbine that would minimize energy losses due to reflected waves.

Another object of the invention is to provide a system that compliments offshore wind farms for increasing the power generating capability thereof.

Another object of the invention is to provide a turbine having a low height profile that can be used to harvest energy from waves, river or tidal flow, or the wind without the use of tall blading.

Another object of the invention is to provide a turbine that minimizes hazards to marine and wild life.

SUMMARY OF THE INVENTION

The objects described above and other advantages and features of the preferred embodiments of the invention are incorporated in a wave turbine system consisting of a long shaft (which could range from several hundred meters to over a kilometer or more, for example) that is positioned above the ocean surface at an oblique angle ($\alpha$) to the predominant wave fronts. Connected to the shaft are pairs of blades, scoops or buckets positioned at intervals along the shaft. Each pair of buckets is rotated 90 degrees about the shaft from each adjacent pair. Each bucket is connected at an offset angle with respect to the shaft so that when the bucket is in the lowermost 6 o'clock position, it presents maximum surface area to an oncoming wave front.

The long shaft is supported by a number of pilings, and the shaft elevation can be raised or lowered at each piling to compensate for tides, so that regardless of the sea level at any given moment, the buckets will only interact with waves when located at the lowermost 6 o'clock position. The turbine height is adjusted so that 6 o'clock buckets are located just above the water's surface, until a wave front flows past and impacts the bucket.

The long shaft, positioned at an oblique angle ($\alpha$) to the wave fronts, allows multiple waves to engage the turbine at all times. As a particular wave passes the turbine, only a small portion of that wave impacts a bucket at any given instant. The wave pushes and lifts the lower bucket in a first bucket pair from the 6 o'clock to the 9 o'clock position, rotating the shaft and causing the 3 o'clock bucket in the adjacent second downstream bucket pair to move into the 6 o'clock position. As that wave front progresses, a different portion of the wave pushes and lifts the lower 6 o'clock bucket of the second bucket pair, rotating the shaft and the adjacent downstream third bucket pair into the wave-engaging position, and so on down the line.

Each bucket is also ideally positively buoyant, so that buckets capture both potential and kinetic wave energy. As a wave flows past a 6 o'clock bucket, the moving wave impacts the bucket, thus transferring a portion of its kinetic energy to the bucket. As the wave flows past, the 6 o'clock bucket also becomes submerged by the wave. As the bucket is positively buoyant, a lifting force is also imparted to the bucket, thus imparting a portion of the wave's potential energy to the bucket. Positive buoyancy of the buckets is created by the use of a double-hull arrangement in which a void is created in each bucket.

One embodiment of the invention includes a method for producing power, including the steps of: dispersing an elongate shaft at an oblique angle with respect to a direction of travel of prevailing waves at a location in a body of water; connecting a plurality of bucket pairs along the axial length of the shaft, with each bucket within the plurality of bucket pairs having a longitudinal axis that does not lie within a plane that is normal to the shaft and each bucket pair of the plurality of bucket pairs having a different radial position about the shaft than an adjacent bucket pair; elevating the shaft above the surface of the body of water so that lowermost buckets within the plurality of bucket pairs are at the elevation of wave crests within said body of water; orienting the longitudinal axis of each the lowermost buckets so that the longitudinal axis is parallel to the wave crest; capturing a portion of a wave crest in the lowermost buckets; and submerging the lowermost buckets in the wave crest thus imparting a buoyant force on the lowermost buckets. The steps of capturing a portion of a wave and submerging said one of said lowermost buckets creates rotational motion of the shaft. The method may also include the step of selectively adjusting the elevation of the shaft to compensate for changes in the surface level of the body of water. The method may also include the steps of supporting the shaft by at least first and second support members and supporting a wind turbine atop at least the first support member. The method may also the step of orienting each of the plurality of bucket pairs to be offset 90 degrees about the shaft from adjacent bucket pairs.

BRIEF DESCRIPTION OF THE DRAWINGS

The invention is described in detail hereinafter on the basis of the embodiments represented in the accompanying figures, in which.

DESCRIPTION OF THE PREFERRED
EMBODIMENT OF THE INVENTION

Co-pending provisional application 61/000,447, filed on Oct. 26, 2007, is incorporated herein by reference.

Figure 1:
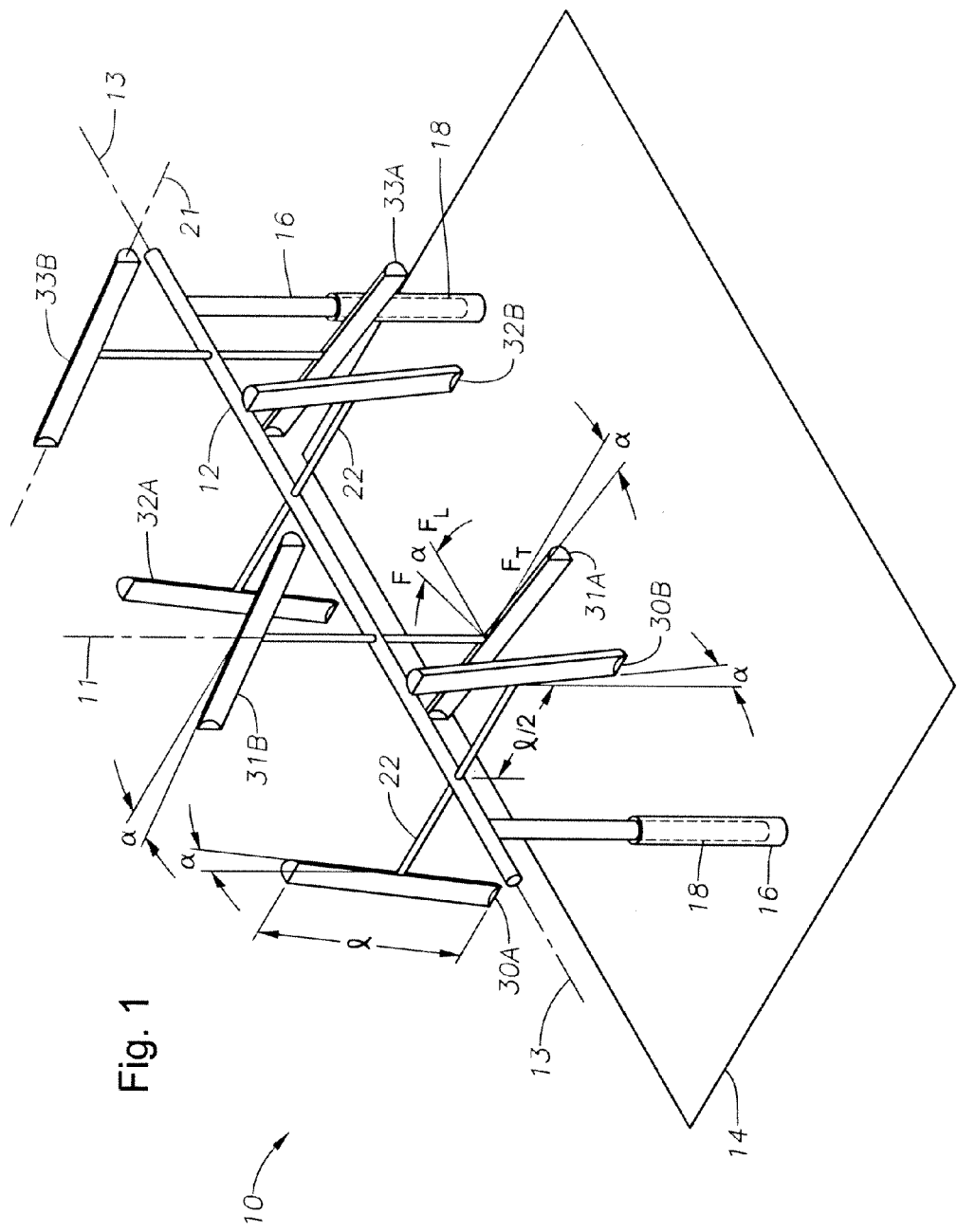
FIG. 1 is a perspective view of a wave turbine according to a preferred embodiment of the invention, showing an elongate drive shaft horizontally and rotatively suspended above the ocean floor by pilings and carrying bucket pairs positioned at intervals along the shaft.

FIG. 1 illustrates a wave turbine 10 according to a preferred embodiment of the invention. Wave turbine 10 is formed of an elongate drive shaft 12 that is rotatively suspended above the ocean floor 14 by a number of pylons, stanchions or pilings 16 that are driven into, anchored or moored to the ocean bed 14. Depending on the water depth at a particular installation, any suitable support arrangement may be used for support 16, such as those used in offshore production platforms, for example. The elevation of drive shaft 12 above the ocean floor 14 is selectively adjustable by changing the height of stanchions 16. Stanchions 16 are preferably telescopic and include actuators 18, such as piston-cylinder, lead screw, or rack and pinion arrangements, for example, which are preferably actuated in unison for adjusting the height of drive shaft 12. Actuators 18 are ideally sealed from the harsh ocean environment as is known in the art.

Although FIG. 1 only shows two stanchions 16 and a relatively short span of drive shaft 12, many stanchions would be used in a typical installation to support a very long drive shaft 12. For example drive shaft 12 may range from less than 100 m in length to 1.5 km or more, depending on the characteristics of the installation site. One end of drive shaft 12 is connected to an electrical generator or other device (not illustrated) that requires a prime mover.

Drive shaft 12 carries along its length buckets, scoops, or blades 30A, 30B, 31A, 31B, 32A, 32B, 33A, 33B that are arranged for capturing both kinetic and potential energy of waves that interact with them, as described more fully hereunder, causing drive shaft 12 to rotate. The preferred arrangement includes many bucket pairs 30, 31, 32, 33 disposed along the length of the drive shaft, with each bucket pair 30, 31, 32, 33 consisting of two buckets 30A, 30B, 31A, 31B, 32A, 32B, 33A, 33B, respectively, positioned 180 degrees about drive shaft 12. Each adjacent bucket pair 30, 31, 32, 33 is preferably rotationally offset 90 degrees about drive shaft 12 from its neighboring bucket pairs. However, other offsets angles may be used. For example, adjacent bucket pairs may be offset 45 degrees from each other about drive shaft 12 with a corresponding reduction in axial spacing between the pairs according to the sinusoidal wave period for maintaining turbine 10 in synchronism with the prevailing waves. Lowering the rotational offset and decreasing the distance between adjacent bucket pairs allows a greater number of bucket pairs per unit length of drive shaft, with a concomitant increase system inertia. If the system rotational inertial becomes too great, it may be desirable to include a starter motor (not illustrated) connected to the shaft to facilitate starting the system from a standstill.

Each bucket 30A, 30B, 31A, 31B, 32A, 32B, 33A, 33B is connected to drive shaft 12 by one or more struts 22. Struts 22 provide a radial spacing between each bucket and drive shaft 12 approximately equal to l/2, where l is the length of the bucket. Lowering the rotational offset between adjacent bucket pairs may require a decrease in bucket length l.

Figure 2:
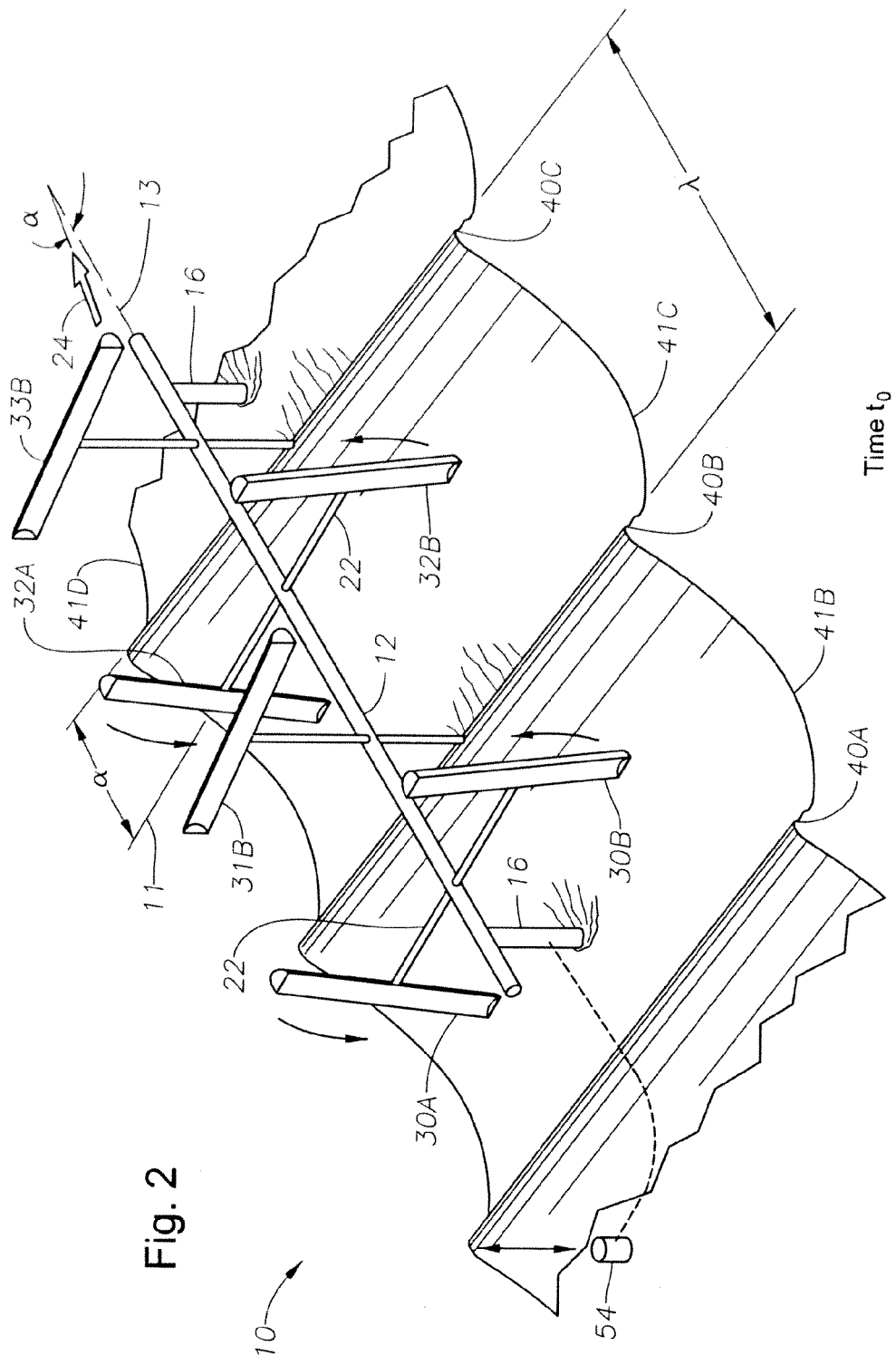
FIG. 2 is a perspective view of the wave turbine of FIG. 1 disposed in the ocean at a time $t_0$ and oriented at an oblique angle $\alpha$ with respect to the direction of travel of the prevailing wave fronts, showing interaction of waves with the lowermost turbine buckets.
Figure 3:
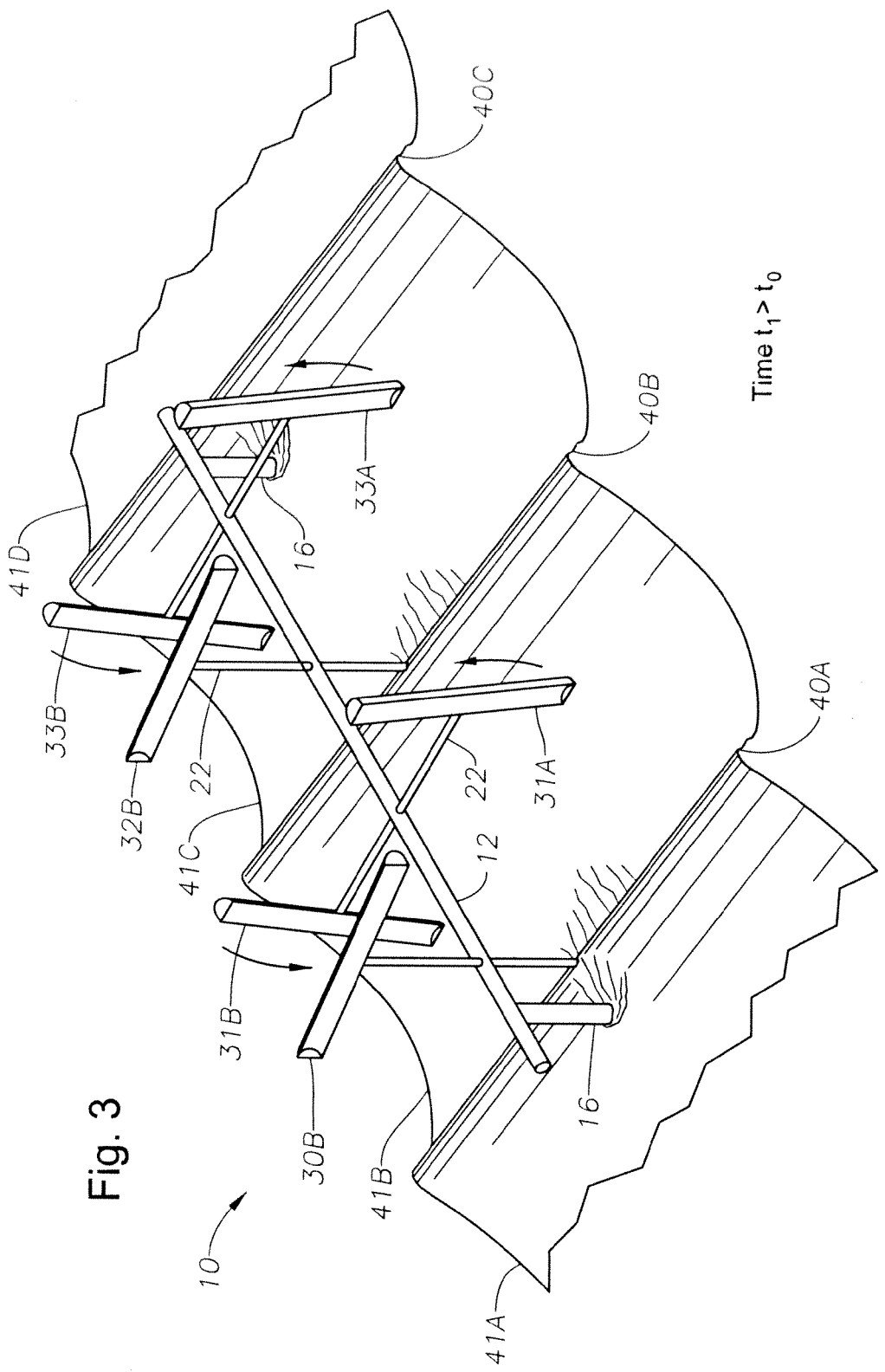
FIG. 3 is a perspective view of the wave turbine of FIG. 2 at a time $t_1$ later than time $t_0$ of FIG. 2, wherein the waves have traveled and the turbine drive shaft has rotated 90 degrees from their respective positions shown in FIG. 2.

Referring to FIGS. 1-3, each bucket 30A, 30B, 31A, 31B, 32A, 32B, 33A, 33B is ideally offset by an angle α from a plane that is normal to the axis 13 of drive shaft 12. Specifically, each bucket 30A, 30B, 31A, 31B, 32A, 32B, 33A, 33B is mounted to drive shaft 12 so that at the bucket's longitudinal midpoint, the bucket's longitudinal axis 21 is perpendicular to a radial 11 of drive shaft 12 (see FIG. 3). For each bucket pair 30, 31, 32, 33, as drive shaft 12 is revolved 360 degrees about its axis 13, the path of the corresponding drive shaft radial 11 defines a plane that is normal to drive shaft axis 13. Each bucket 30A, 30B, 31A, 31B, 32A, 32B, 33A, 33B is rotated at its longitudinal midpoint about its corresponding radial 11 so that the bucket longitudinal axis 21 does not lie within this normal plane—rather, the bucket's longitudinal axis 21 intersects the normal plane at the bucket's midpoint at an intercept angle of α. This angle α is referred to as the wave front offset angle. Each bucket 30A, 30B, 31A, 31B, 32A, 32B, 33A, 33B is offset by the wave front offset angle α so that when the bucket is oriented at its lowermost 6 o'clock position, the bucket longitudinal axis 21 is parallel to the wave front of the predominant or prevailing waves. The axis 13 of drive shaft 12 is likewise offset by the wave front offset angle α from the direction of travel of the predominant waves, indicated by arrow 24 of FIG. 2.

Referring to FIG. 2, the basic operating principle of wave turbine 10 is the same as for wind turbines and hydroelectric turbines—a moving fluid mass imparts a force on the turbine buckets to produce a torque that causes rotation of the turbine shaft and an attached generator. Specifically, moving wave fronts in the ocean interact with buckets 30A, 30B, 31A, 31B, 32A, 32B, 33A, 33B of wave turbine 10 to turn drive shaft 12.

Drive shaft 12 is selectively elevated by actuators 18 (FIG. 1) so that the lowermost 6 o'clock buckets 31A, 33A (see FIG. 1) would be disposed just above the water's surface if the ocean was perfectly calm at that location. However, ideally the ocean would not be calm, and the water's surface would be characterized by alternating wave crests 40A, 40B, 40C and wave troughs 41B, 41C, 41D, of a wavelength λ, that travel toward the shore. The 6 o'clock buckets 31A, 33A are disposed at an elevation which subjects them to impact by and submersion within the wave crests 40A, 40B as the crests pass by. Each bucket 31A, 33A captures a portion of the water contained in wave crest 40A, 40B, respectively, which imparts a force F (FIG. 1) on the bucket that is transmitted to drive shaft 12 via strut 22. Because the buckets are offset by the wave front offset angle α, the wave force F is also applied at an oblique angle to drive shaft axis 13.

With respect to drive shaft axis 13, wave force F may be resolved into a longitudinal component, $F_L = F \sin \alpha$, and a transverse component, $F_T = F \cos \alpha$. The transverse component $F_T$ acts through strut 22 to apply a counterclockwise torque to drive shaft 12, as depicted by the arrows in FIG. 2. The rotation of drive shaft 12, caused by the wave-induced torque of the 6 o'clock buckets 31A, 33A, causes these buckets to rotate out of the water into the 3 o'clock position and the adjacent 9 o'clock buckets 30A, 32A to rotate into the 6 o'clock position.

FIG. 3 illustrates wave turbine 10 of FIG. 2 a moment later in time. The ocean waves have traveled in the direction of arrow 24 (FIG. 2). Wave crest 40B, which was previously interacting with bucket 31A, is now interacting with bucket 32A. In other words, each wave pushes and lifts the lower bucket in a first bucket pair from the 6 o'clock to the 9 o'clock position, rotating the shaft and causing the 3 o'clock bucket in the adjacent second downstream bucket pair to move into the 6 o'clock position. As that wave front progresses, a different portion of the wave pushes and lifts the lower 6 o'clock bucket of the second bucket pair, rotating the shaft and the adjacent downstream third bucket pair into the wave-engaging position, and so on down the line. This process continues to produce rotation along the full length of the shaft until the entire wave passes, transferring a significant portion of its energy to the rotating shaft, one bucket at a time. As one wave moves forward to shore, it is followed by another, then another in a continuous wave train. In this manner, drive shaft 12 is continuously and smoothly rotated.

Because axis 13 of drive shaft 12 is offset from the direction of wave travel 24 by the wave front offset angle α, the section of wave crest 40B that interacts with bucket 32A at time $t_1$ is not the exact same section of wave crest 40B that previously interacted with bucket 31A at time $t_0$ (FIG. 2). Rather, as a wave crest travels, the section that engages each adjacent 6 o'clock bucket is laterally offset from the previous wave crest section. That is, as a particular wave passes the turbine 10, only a small portion of that wave impacts a bucket at any given instant. However, there may be some overlapping portion of two adjacent wave front sections, depending on the wave front offset angle α, the axial distance along the drive shaft 12 between bucket pairs, and the length l of the buckets.

For maximum efficiency, drive shaft 12 and turbine buckets 30A, 30B, 31A, 31B, 32A, 32B, 33A, 33B are designed and dimensioned to function optimally within a range of wave amplitudes, wavelengths, and periods that reflect the prevailing conditions at the installation site. For example, 20 foot buckets are inappropriately long for an area that averages only waves of 5-10 feet amplitude. The length, orientation, and wave front offset angle α of drive shaft 12 is dependent on the installation site characteristics. Likewise, the supporting stanchions 16 driven must be placed at intervals suitable to provide adequate stability from the shearing forces of the wave collision that could distort the rotating shaft from a linear alignment.

In an alternate embodiment, wave turbine 10 may use controllable pitch or controllable reversible pitch buckets to accommodate waves traveling in any direction. Such an arrangement may be useful, for example, in capturing energy from tidal flows into and out of a harbor. As controllable pitch blading is well known in the art, such an arrangement is not discussed further herein.

Although only one wave turbine 10 is illustrated herein, the invention contemplates that numerous wave turbines may be located at a site to create a "wave farm." For example, wave turbines 10 may be arranged in parallel rows, may be placed in zigzag arrangements, or some other arrangement or combination. Wave turbines may also have left-hand or right-hand configurations as appropriate.

Figure 4:
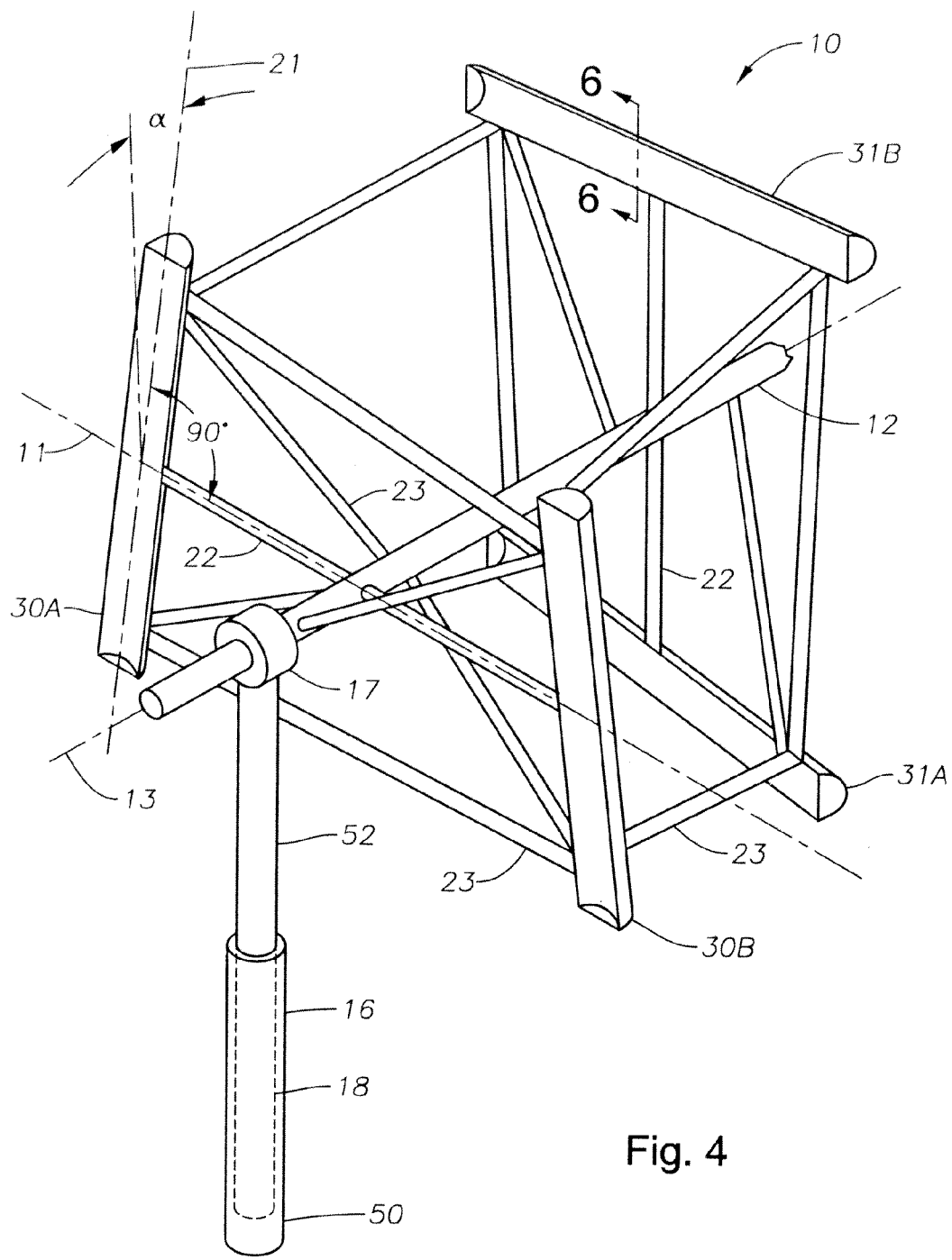
FIG. 4 is an enlarged perspective view of a portion of the wave turbine of FIG. 1, showing detail of a telescopic piling, drive shaft, drive shaft bearing, turbine buckets, and trussing for supporting and bracing the turbine buckets.

FIG. 4 illustrates detail of a typical portion of wave turbine 10. Each bucket 30A, 30B, 31A, 31B has a box-like shape that functions as a scoop for capturing water. As drive shaft 12 and the 6 o'clock bucket 31A rotate out of the water, the water contained in the scoop is poured out. In this manner, a reduction of the momentum of the captured wave is transferred as an impulse force to the bucket.

Stanchions 16 are preferably telescopic, having a lower base portion 50 that is driven into the sea floor or otherwise fastened or anchored as is known in the art, and an upper portion 52 which can be moved longitudinally with respect to base portion 50. An actuator 18 is used to move and position upper support 52 with respect to base 50. Actuator 18 may be, for example, a lead screw arrangement, a rack and pinion arrangement, or a hydraulic piston-cylinder arrangement. The telescopic arrangement of stanchions 16 accommodates the variation in ocean tides and wave heights. A wave height sensor 54 (shown schematically in FIG. 2) may be used to provide an input signal for adjusting stanchions 16 to the optimal height. Alternatively, the height may be set as a function of pre-programmed tide tables, for example. This dynamic stanchion height feature is the only movable adjustment needed for the wave turbine 10 to function efficiently under the variable but typically prevailing conditions. The height adjustment feature also provides protection by allowing the elevation or submergence of wave turbine 10 above or below the wave zone during severe storms.

Shaft bearings 17 are employed to rotatively support drive shaft 12 on stanchions 16. Bearings 17 also provide thrust support. Bearings 17 are preferably sealed from the ocean environment. Drive shaft 12 is preferably assembled on site from individual shaft sections. Universal joints (not illustrated) may be used to couple drive shaft sections to accommodate any vibration or distortion caused by wave shearing forces. In addition to or in place of strut 22, a truss-like system of bracing 23 is preferably used to connect the buckets 30A, 30B, 31A, 31B to drive shaft 12 and to one another. Bracing 23 adds rigidity and strength to wave turbine 10. Design of bracing 23 varies depending on the configuration, turbine design parameters, and expected loads. As such structural design is known to those skilled in the art, no further discussion is included. A screen (not illustrated) may be secured about bracing 23 and buckets 30A, 30B, 31A, 31B to protect marine life from harm by turbine 10.

Figure 5:
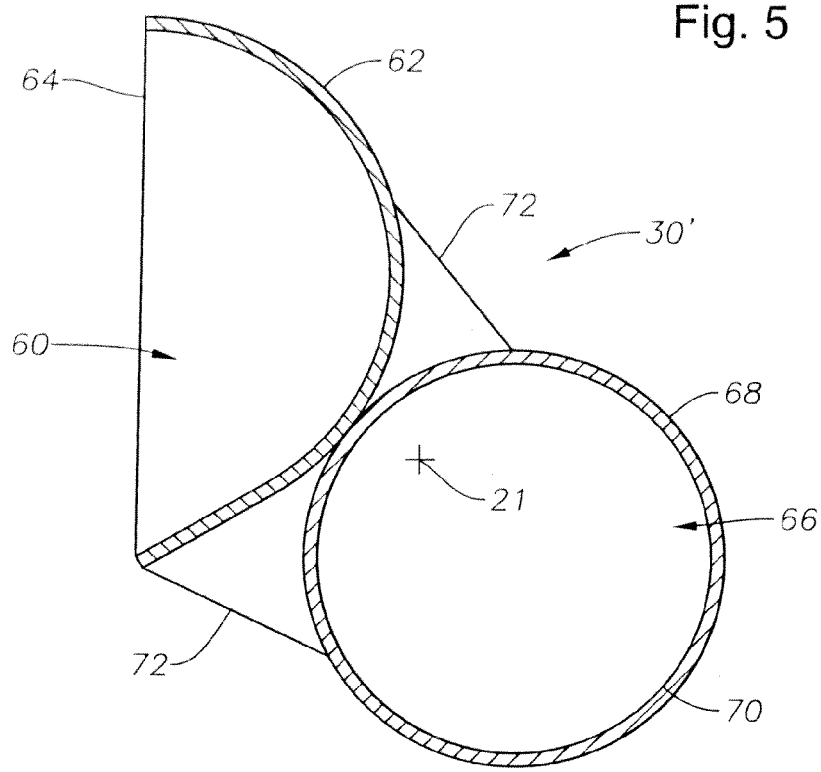
FIG. 5 is a transverse cross section view of a wave turbine bucket according to a first embodiment of the invention, showing an open box-like scoop section for capturing water from a moving wave and a closed cylindrical drum section that provides positive buoyancy for creating a lifting force when the bucket is submerged.

FIG. 5 is a cross section view, taken transversely to bucket longitudinal axis 21, of a bucket 30' of wave turbine 10 according to a first embodiment of the invention. Bucket 30' has an open box-like scoop 60 formed of an arcuate back wall 62 of length l (FIG. 1) sandwiched between two endplates 64. Scoop 60 is designed to extract wave kinetic energy by capturing a portion of the wave therein. Bucket 30' also includes a drum 66 that is preferably formed of a cylindrical wall 68, also of length l sandwiched between two endplates 70. Drum 66 is watertight, sealed from the ocean environment, and filled with air or foam for positive buoyancy. As bucket 30' becomes submerged in a wave crest, its positive buoyancy creates an upward lifting force that converts a portion of the wave's potential energy to bucket kinetic energy for rotating the turbine drive shaft. A number of ribs 72 are longitudinally intervaled and connected between scoop 60 and drum 66 for connecting the two members and creating strength and rigidity.

Figure 6:
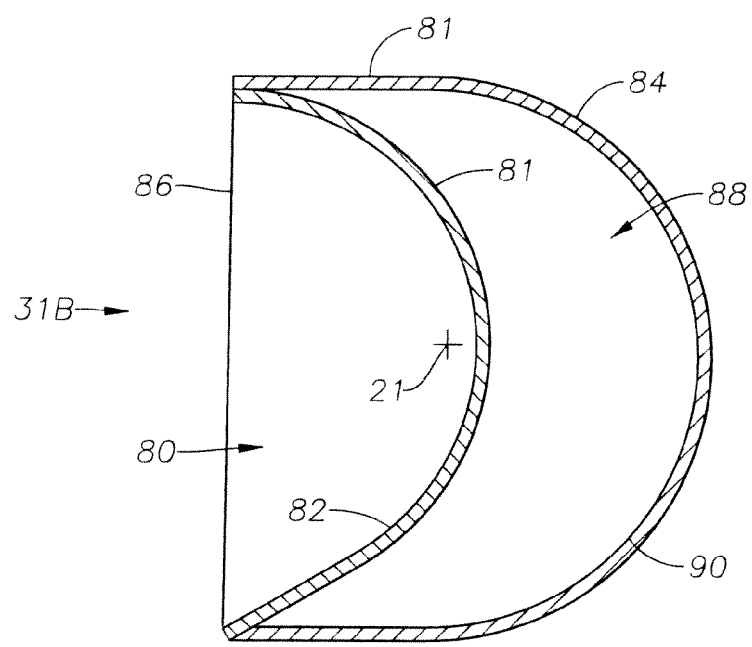
FIG. 6 is a transverse cross-section view of a wave turbine bucket according to a second embodiment of the invention, taken along lines 6-6 of FIG. 4, showing a double-hull construction that defines an open box-like scoop section for capturing water from a moving wave and a closed internal void that provides positive buoyancy for creating a lifting force when the bucket is submerged.
Figure 7:
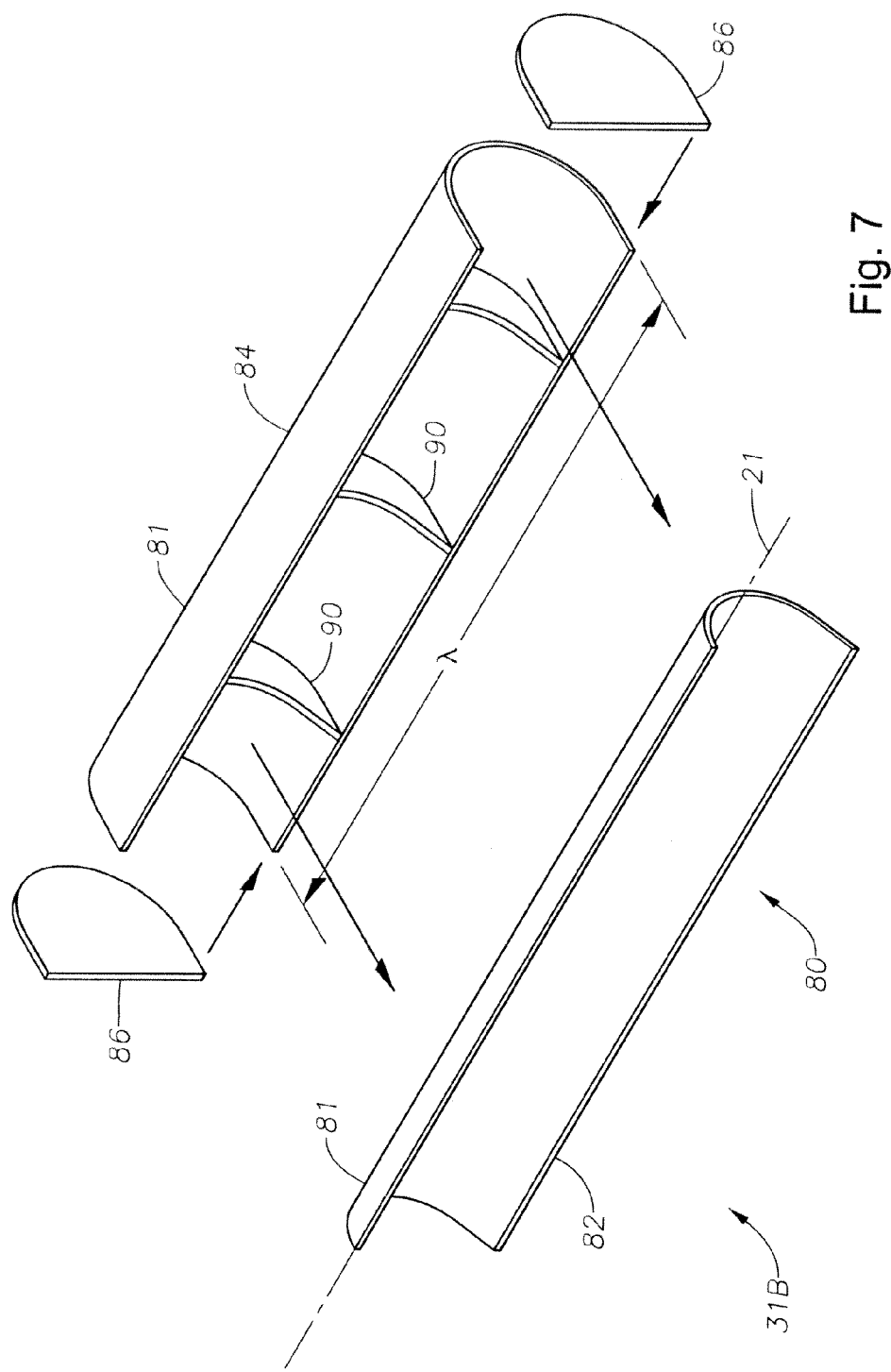
FIG. 7 is an exploded diagram of the bucket of FIG. 6, showing a double-hill construction with internal ribs within the void section for enhancing the strength, rigidity, and watertight integrity of the bucket.

FIG. 6 is a cross section view, taken transversely to bucket longitudinal axis 21 along lines 6-6 of FIG. 4, of bucket 31B of wave turbine 10 according to a second embodiment of the invention. FIG. 7 is an exploded diagram of FIG. 6. Referring to FIGS. 6-7 collectively, bucket 31B has an open box-like scoop 80 formed of an arcuate double-hull wall 81 of length l (FIG. 1). The double-hull wall 81 is formed of an inner arcuate wall 82, which forms the back wall of scoop 80, and an outer arcuate wall 84. Double-hull wall 81 is sandwiched between two endplates 86. Scoop 80 is designed to extract wave kinetic energy by capturing a portion of the wave therein. Double-hull wall 81 defines a watertight cavity 88, which is sealed from the ocean environment and filled with air or foam for positive buoyancy. As bucket 31B becomes submerged in a wave crest, its positive buoyancy creates an upward lifting force that converts a portion of the wave's potential energy to bucket kinetic energy for rotating the turbine drive shaft. A number of ribs 90 are longitudinally intervaled and connected between the inner and outer walls 82, 84 of double hull wall 81 for creating strength and rigidity and aiding watertight integrity.

Although buckets 30A, 30B, 31A, 31B are shown as having flat end plates (e.g., endplates 86 of FIG. 7), in an alternate embodiment of the invention, one or both of the bucket ends is rounded or pointy, for example, like the bow of a canoe. In this manner, if turbine 10 is out of synchronism with the wave flowing by such that the 3 o'clock bucket impacts a wave crest as the bucket is rotated downwardly, the hydrodynamic end of the bucket will enter the water with less force. Buckets with curved hydrodynamic ends are also preferable when turbine 10 is intended to be immersed in a fluid stream during normal operation.

Figure 8:
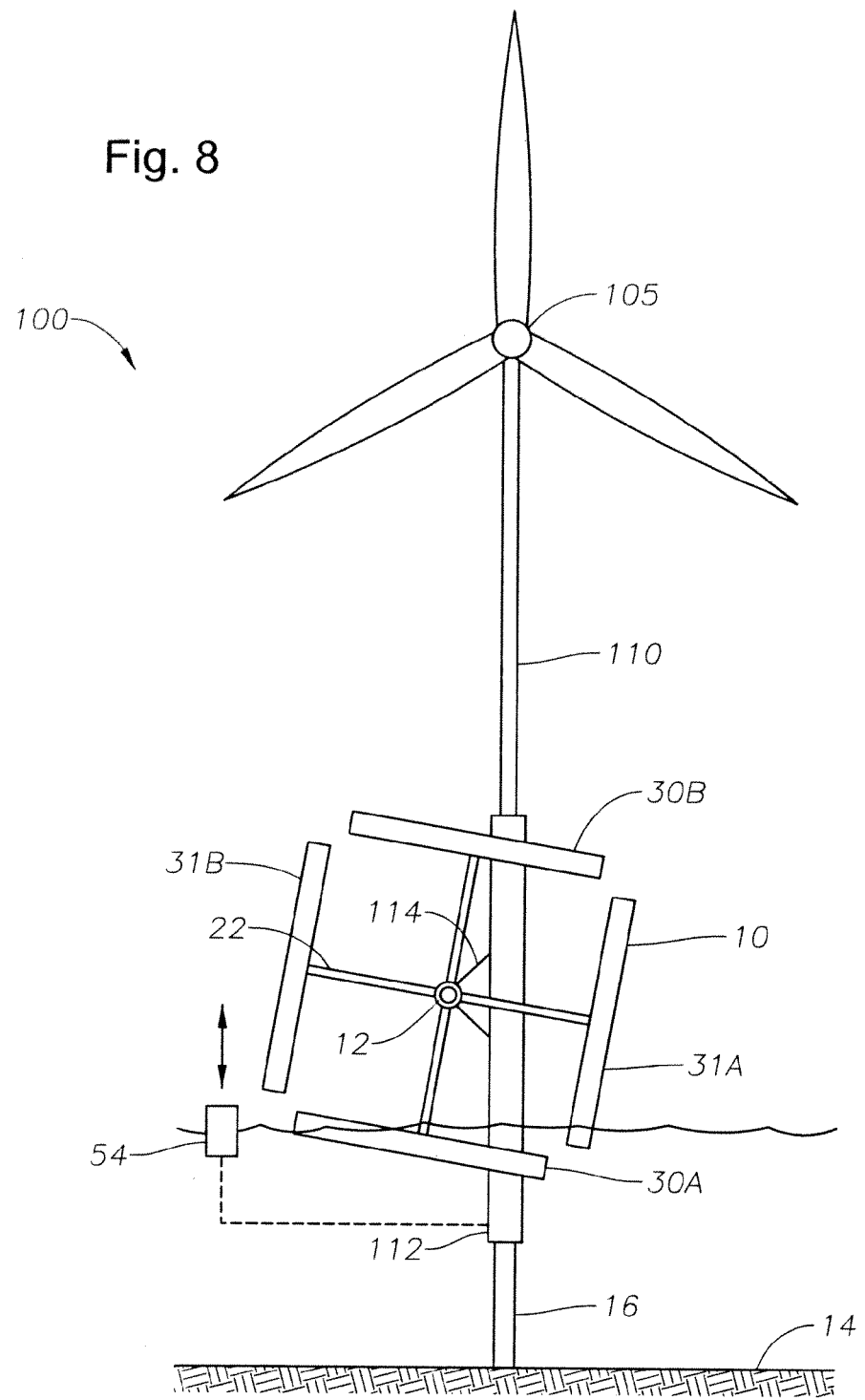
FIG. 8 is an end view of an arrangement for providing alternative energy according to a preferred embodiment of the invention, showing a wave turbine as illustrated in FIG. 1 in synergistic combination with an offshore wind turbine mounted atop a common support piling.
Figure 9:
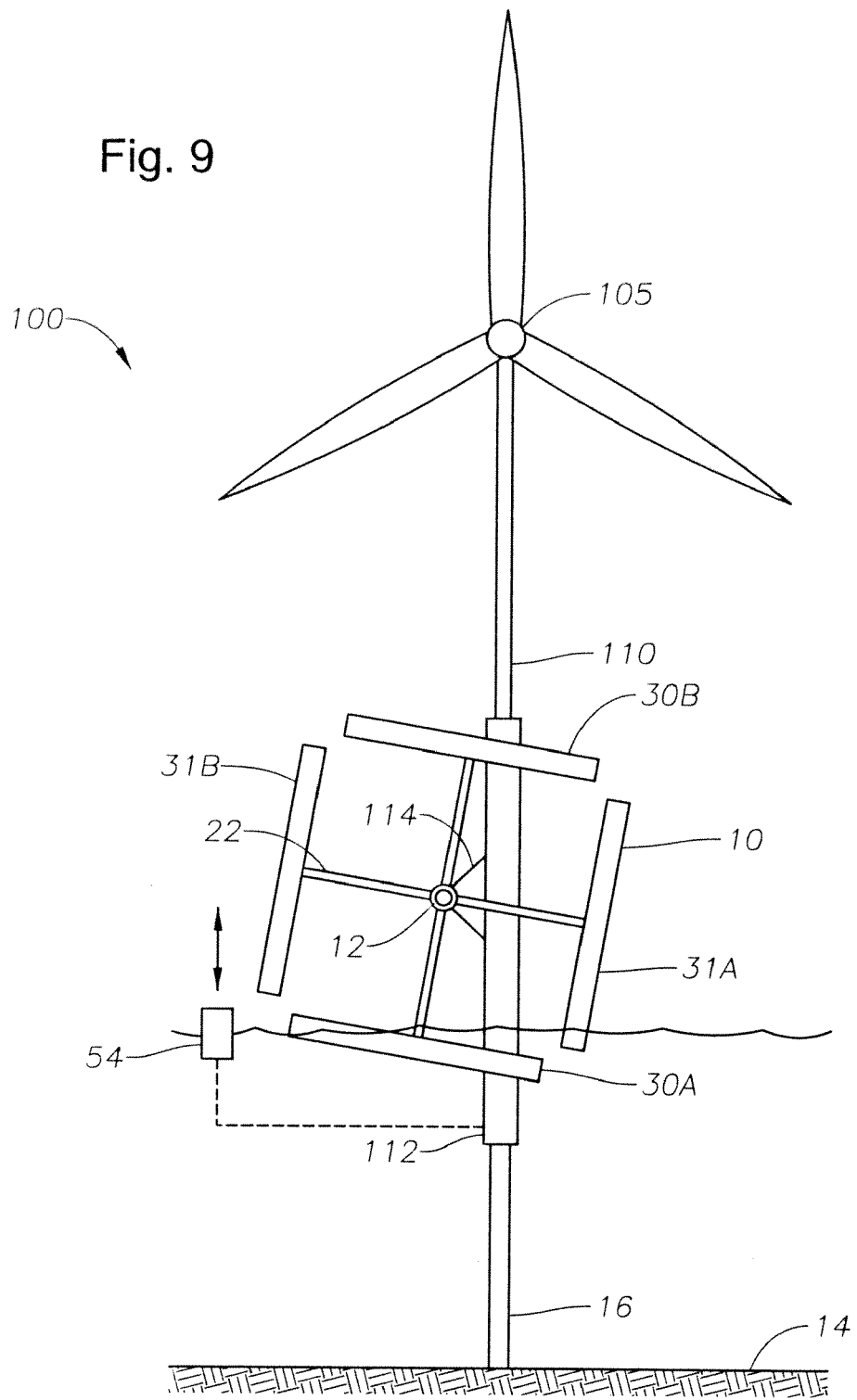
FIG. 9 is an end view of the arrangement of FIG. 8, showing the wave turbine disposed at a higher elevation than that of FIG. 8 to accommodate an increased sea level at high tide.

FIGS. 8 and 9 illustrate an alternative arrangement 100 for providing "green" energy according to a preferred embodiment of the invention. System 100 includes a wave turbine 10 as illustrated in FIG. 1 and described hereinabove, in synergistic combination with a number of offshore wind turbines 105 mounted atop stanchions 16. Stanchions 16 preferably include a fixed piling 110 that is secured to the sea floor 14, to which wind turbines 105 are mounted. Slideably fixed about piling 110 is a collar 112, which carries the drive shafting 12 of wave turbine 10 by a bracket arrangement 114. The elevation of collar 112 is selectively controllable so that the height of wave turbine 10 can be adjusted to compensate for the tides, for example. Each stanchion 16 preferably includes an actuator 18 (FIG. 1), such as a rack and pinion, lead screw, or piston-cylinder arrangement that is used to vertically position collar 112. Although a collar 112 is described for supporting wave turbine 10 at selective elevations on stanchion 16, other suitable arrangements can be used, such as a track system mounted on the side of the piling 110.

The construction materials for wave turbine 10, and the maintenance techniques used therefor, are preferably the same as used for ships, offshore drilling platforms, suspension bridges, electrical transmission towers, and other marine equipment that routinely withstand the harsh environmental conditions of the ocean.

Wave turbine 10 is arranged to capture both kinetic and potential energy of ocean waves. In addition to power generation, a benefit of this energy extraction by wave turbine 10 is mitigation of beach erosion due to reduced wave energy reaching the nearby shore. It is known in the art that the power $P_w$ transmitted (from both the kinetic and potential energy components) in a plane ocean wave, having a wave front distance L, can be computed by:

$$P_w = \frac{L}{2}\rho g a^2 c_g \quad (1)$$

where $\rho$ is the density of sea water, g is the acceleration due to gravity, a is the wave amplitude, and $c_g$ is the wave group velocity. In deep water (water depth greater than one half the wavelength $\lambda$):

$$c_g = \frac{\lambda}{2T} = \frac{gT}{4\pi} = \sqrt{\frac{g\lambda}{8\pi}} \quad (2)$$

where T is the wave period. Thus, the power within a 1 km long section of a typical wind-driven wave, which has an amplitude a of 3 m and a wavelength $\lambda$ of 100 m, is 275 MW. A 1 km long wave turbine 10 that converts seven percent of this wave energy to electricity would produce 19 MW. This is equivalent to almost 98,000 barrels of oil per year. In comparison, by today's standards, what is considered to be a fairly densely populated wind farm may accommodate four 1.5 MW wind turbines positioned along a 1 km long line for a roughly equivalent power generation capability. Thus, for the apparatus 100 of FIGS. 8-9, the addition of wave turbine 10 to an offshore wind farm could possibly double the electrical generating capacity of the site.

Electrical power produced by harvesting wave energy may be consumed directly, and if the production exceeds local demand, excess may be sold elsewhere via a regional power grid. Alternatively, wave power may be used to generate hydrogen and oxygen gas by electrolytic decomposition of water on site. The produced hydrogen may be used in fuel cells or for combustion to power steam turbines or to power other machinery, such as automobiles, buses, trains, or farm machinery. Combustion of hydrogen and oxygen produces exhaust steam, which may possibly be condensed into fresh water for crop irrigation or drinking. Wave energy may lessen dependence on fossil fuels with the benefit of reducing greenhouse gases, without the need for reduced energy consumption. Thus, wave turbine 10, alone or in combination with wind turbines, may be an attractive part of the energy supply of any coastal region in the world with significant wave action.

Although turbine 10 is described herein as suited for capturing wave energy from the ocean or from larges lakes, for example, when the turbine is viewed from a vantage point along the direction of wave travel 24, it is apparent that for each bucket pair, one bucket always presents a greater area than the other, so that even if the turbine was fully immersed in the water, fluid flow in the direction of wave travel 24 would cause drive shaft 12 to rotate. Thus, wave turbine 10 is also suitable to harvest energy from rivers and other flowing fluids without significant wave activity, or from the wind. For example, turbine 10, with its elongate shaft having many relatively small buckets, may be mounted in rows on top of tall buildings for harnessing wind energy without the unsightlyness or bird hazard associated with traditional wind turbines having long blades. Or, turbine 10 may be used to harvest a small piece of river flow energy at each community along the river's path.

Although not illustrated, the turbine system according to a preferred embodiment of the invention may include screening about its circumference to protect marine and wild life from becoming ensnared within or otherwise harmed by the rotating components of the turbine. It is feasible to screen turbine 10 because the turbine has an elongate, but relatively short profile as compared to that of an ordinary wind turbine, for example. Screening will not significantly affect flow to turbine 10.

The Abstract of the disclosure is written solely for providing the United States Patent and Trademark Office and the public at large with a way by which to determine quickly from a cursory reading the nature and gist of the technical disclosure, and it represents solely a preferred embodiment and is not indicative of the nature of the invention as a whole.

While some embodiments of the invention have been illustrated in detail, the invention is not limited to the embodiments shown; modifications and adaptations of the above embodiment may occur to those skilled in the art. Such modifications and adaptations are in the spirit and scope of the invention as set forth herein.

What is claimed is:

1. A turbine system (10) for extracting energy from waves in a body of water, said body of water characterized by a direction of prevailing waves (24), the turbine system comprising:
   an elongate shaft (12) rotationally disposed above the surface of said body of water, said shaft defining a longitudinal shaft axis (13); and
   a plurality of bucket pairs (30, 31, 32, 33) connected at intervals along the axial length of said shaft, each of said plurality of bucket pairs including a first bucket (30A, 31A, 32A, 33A) and a second bucket (30B, 31B, 32B, 33B) that is disposed 180 degrees about said shaft with respect to said first bucket, said first and second buckets defining first and second longitudinal bucket axes (21), respectively, each of said plurality of bucket pairs being oriented at a different radial position about said shaft than an adjacent one of said plurality of bucket pairs, said bucket axis of each bucket in each of said plurality of bucket pairs being oriented so that said bucket axis does not lie in a plane that is normal to said shaft axis.

2. The turbine system of claim 1 wherein:
   said shaft is disposed so that said shaft axis is oriented at an oblique angle ($\alpha$) with respect to said direction of prevailing waves.

3. The turbine system of claim 1 wherein:
   each bucket of said plurality of bucket pairs includes a scoop portion (60, 80) that is open to said body of water and a buoyant portion (66, 88) that is hollow and sealed from said body of water.

4. The turbine system of claim 1 wherein:
   each of said plurality of bucket pairs is offset 90 degrees about said shaft from adjacent bucket pairs.

5. The turbine system of claim 1 wherein:
the length of said shaft exceeds 100 meters.

6. The turbine system of claim 1 further comprising:
a plurality of support members (16), said plurality of support members carrying a bearing (17) at a selectively adjustable elevation, said shaft being rotatively supported by said plurality of bearings.

7. The turbine system of claim 6 further comprising:
a wind turbine (105) connected at an upper end of one of said plurality of support members.

8. A wave turbine comprising:
a drive shaft (12) defining a drive shaft axis (13), first and second radials (11) that define a first radial plane normal to said drive shaft axis, and third and fourth radials (11) that define a second radial plane normal to said drive shaft axis;
first and second struts (22) lying within said first radial plane having first ends connected to said drive shaft;
third and fourth struts (22) lying within said second radial plane having first ends connected to said drive shaft;
first, second, third and fourth buckets (30A, 30B, 31A, 31B) connected to second ends of said first, second, third and fourth struts, respectively, said first bucket defining a first longitudinal bucket axis (21) that does not lie in said first radial plane, said second bucket defining a second longitudinal bucket axis (21) that does not lie in said first radial plane, said third bucket defining a third longitudinal bucket axis (21) that does not lie in said second radial plane, said fourth bucket defining a fourth longitudinal bucket axis (21) that does not lie in said second radial plane.

9. The wave turbine of claim 8 wherein:
said first, second, third and fourth struts are disposed along said first, second, third, and fourth radials, respectively.

10. The turbine system of claim 8 wherein:
said first, second, third and fourth buckets each includes an open scoop portion (60, 80) and a closed, hollow portion (66, 88).

11. The turbine system of claim 8 wherein:
said first and second buckets are offset 90 degrees about said shaft from said third and fourth buckets, respectively.

12. The turbine system of claim 8 wherein:
the length of said shaft exceeds 100 meters.

13. The turbine system of claim 8 further comprising:
first and second support members (16) carrying first and second bearings (17), respectively, at a selectively adjustable elevation, said drive shaft being rotatively supported by said first and second bearings.

14. The turbine system of claim 13 further comprising:
a wind turbine (105) connected at an upper end of one of said plurality of support members (16).

15. The turbine system of claim 8 further comprising:
bracing (23) connected between said first and second buckets; and
bracing (23) connected between said first and third buckets.

16. A method for producing power comprising the steps of:
dispersing an elongate shaft (12) at an oblique angle ($\alpha$) with respect to a direction of travel (24) of prevailing waves at a location in a body of water;
connecting a plurality of bucket pairs (30, 31, 32, 33) along the axial length of said shaft, each bucket (30A, 30B, 31A, 31B, 32A, 32B, 33A, 33B) within said plurality of bucket pairs having a longitudinal axis (21) that does not lie within a plane that is normal to said shaft, each bucket pair of said plurality of bucket pairs having a different radial position about said shaft than an adjacent bucket pair;
elevating said shaft above the surface of said body of water so that lowermost buckets (31A, 33A) within said plurality of bucket pairs are at the elevation of wave crests (40B, 40C) within said body of water;
orienting said longitudinal axis of each said lowermost buckets so that said longitudinal axis is parallel to said wave crest;
capturing a portion of a wave crest in one of said lowermost buckets; and
submerging said one of said lowermost buckets in said wave crest thus imparting a buoyant force on said one of said lowermost buckets;
whereby said steps of capturing a portion of a wave and submerging said one of said lowermost buckets creates rotational motion of said shaft.

17. The method of claim 16 further comprising the steps of:
selectively adjusting the elevation of said shaft to compensate for changes in the surface level of said body of water.

18. The method of claim 16 further comprising the steps of:
supporting said shaft by at least first and second support members (16); and
supporting a wind turbine (105) atop at least said first support member.

19. The method of claim 16 further comprising the step of:
orienting each of said plurality of bucket pairs to be offset 90 degrees about said shaft from adjacent bucket pairs.

\* \* \* \* \*